US008258884B2

(12) United States Patent
Borwick, III et al.

(10) Patent No.: US 8,258,884 B2
(45) Date of Patent: Sep. 4, 2012

(54) SYSTEM FOR CHARGING A VAPOR CELL

(75) Inventors: Robert L. Borwick, III, Thousand Oaks, CA (US); Alan L. Sailer, Camarillo, CA (US); Jeffrey F. DaNatale, Thousand Oaks, CA (US); Philip A. Stupar, Oxnard, CA (US); Chialun Tsai, Thousand Oaks, CA (US)

(73) Assignee: Teledyne Scientific & Imaging, LLC

(*) Notice: Subject to any disclaimer, the term of this patent is extended or adjusted under 35 U.S.C. 154(b) by 398 days.

(21) Appl. No.: 12/645,207

(22) Filed: Dec. 22, 2009

(65) Prior Publication Data

US 2011/0232782 A1 Sep. 29, 2011

(51) Int. Cl.
*H01S 1/06* (2006.01)
*H01S 3/30* (2006.01)

(52) U.S. Cl. .................. 331/94.1; 331/3; 372/6; 372/56

(58) Field of Classification Search ................. 331/94.1, 331/3; 372/6, 55; 385/12, 14
See application file for complete search history.

(56) References Cited

U.S. PATENT DOCUMENTS 3,654,567 A * 4/1972 Hodgson ......................... 372/56
7,286,575 B2 * 10/2007 Payne et al. ....................... 372/6

OTHER PUBLICATIONS

Lutwak, R. et al., "The Chip-Scale Atomic Clock-Recent Development Progress", *Proceedings of the 34th Annual Precise Time and Time Interval Systems Applications Meeting*, p. 1-12, San Diego, California, Dec. 2-4, 2003.

Kitching, J. et al., "Chip-Scale Atomic Clocks at NIST", *2005 NCSL International Workshop and Symposium*, Aug. 7, 2005.

Kitching, J. et al., "Chip-Scale Atomic Frequency References: Fabrication and Performance", *19th European Frequency and Time Forum*, Besançon, France, p. 575-580, Mar. 21, 2005.

Kitching, J. et al., "Microfabricated Atomic Clocks", *Presentation at 18th IEEE International Conference on Micro Electro Mechanical System*, O-7803-8732-5/05, Jan. 30-Feb. 3, 2005, p. 1-7.

Knappe, S. et al., "Atomic vapor cells for chip-scale atomic clocks with improved long-term frequency stability", *Optics Letters*, Sep. 15, 2005, vol. 30, No. 18, p. 2351-2353.

Youngner, D.W. et al., "A Manufacturable Chip-Scale Atomic Clock", *Presentation at 14th International Conference on Solid-State Sensors, Actuators and Microsystems*, Lyon, France, Jun. 10-14, 2007, p. 39-44.

Donley, Elizabeth, "Chip-Scale, Microfabricated Atomic Clocks", *International Telecom Sync Forum*, Munich, Germany, Nov. 4, 2008.

DeNatale, J.F. et al., "Compact, Low-Power Chip-Scale Atomic Clock", *IEEE ION/PLANS 2008*, Monterey, CA, May 5-8, 2008.

* cited by examiner

*Primary Examiner* — Arnold Kinkead

(57) ABSTRACT

A system is disclosed for charging a compact vapor cell, including placing an alkali-filled capillary into a reservoir cell formed in a substrate, the reservoir cell in vapor communication with an interrogation cell in the substrate and bonding a transparent window to the substrate on a common face of the reservoir cell and the interrogation cell to form a compact vapor cell. Capillary action in the capillary delays migration of alkali in the alkali-filled capillary from the reservoir cell into the interrogation cell during the bonding.

17 Claims, 5 Drawing Sheets

FIG. 1
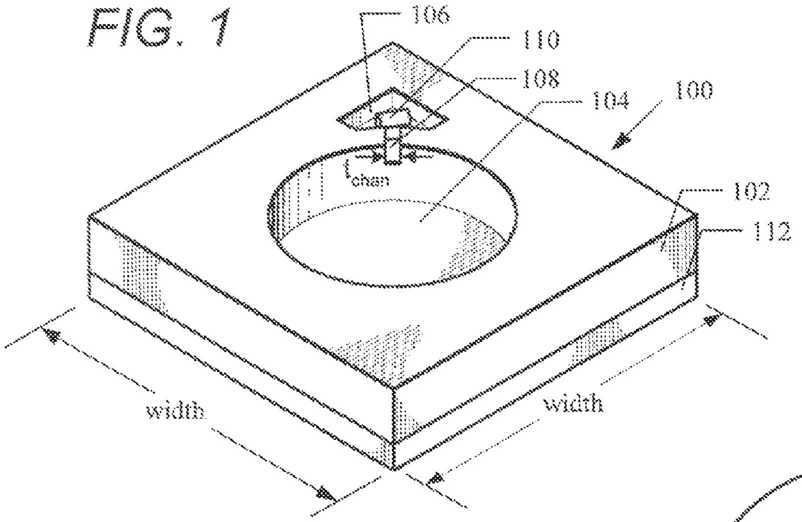
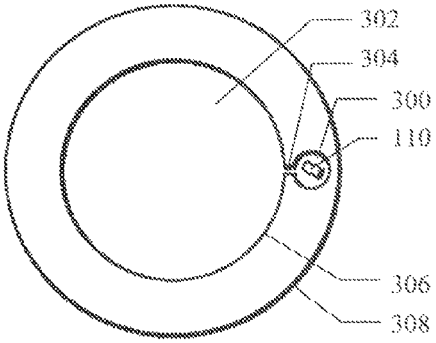
FIG. 3A
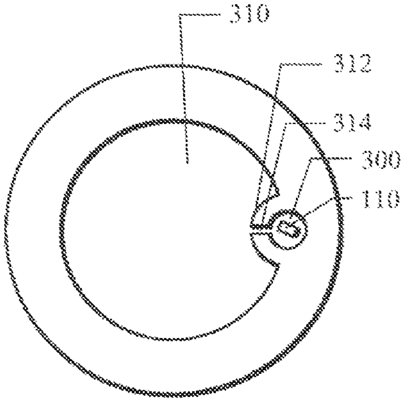
FIG. 3B
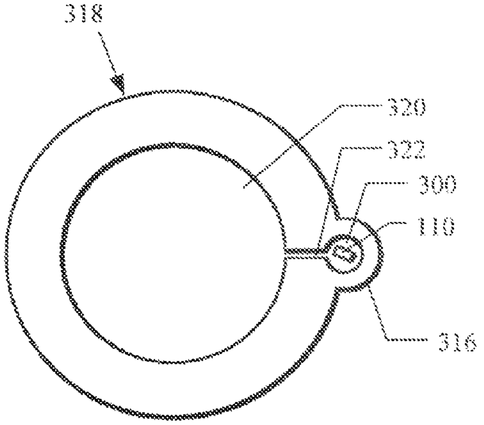
FIG. 3C

FIG. 4
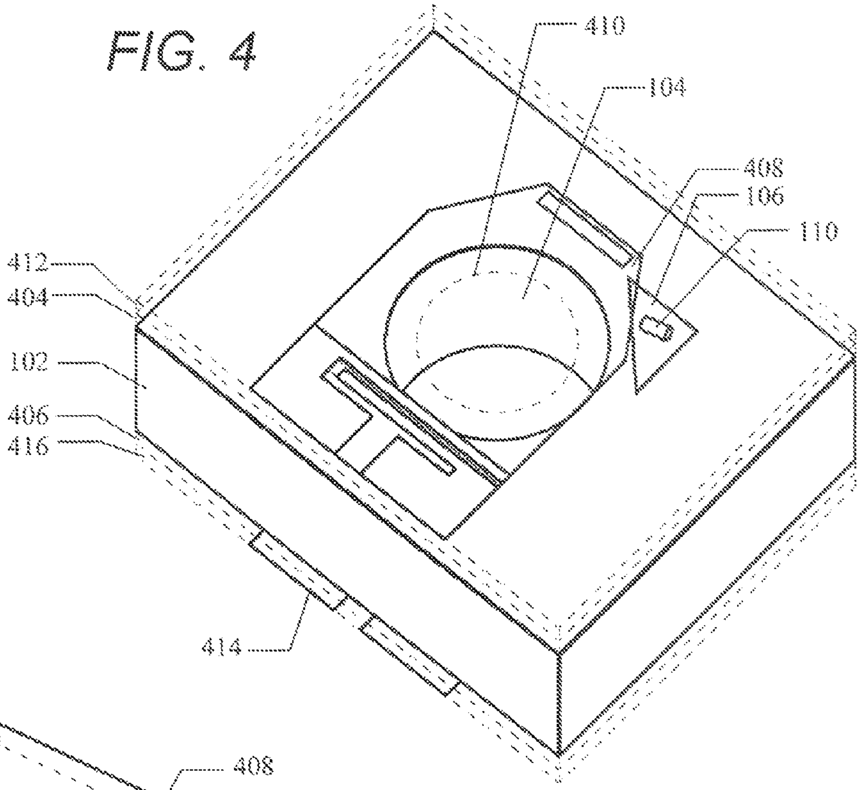
FIG. 5
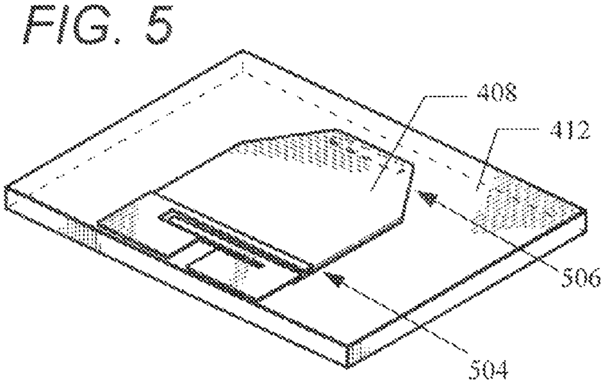
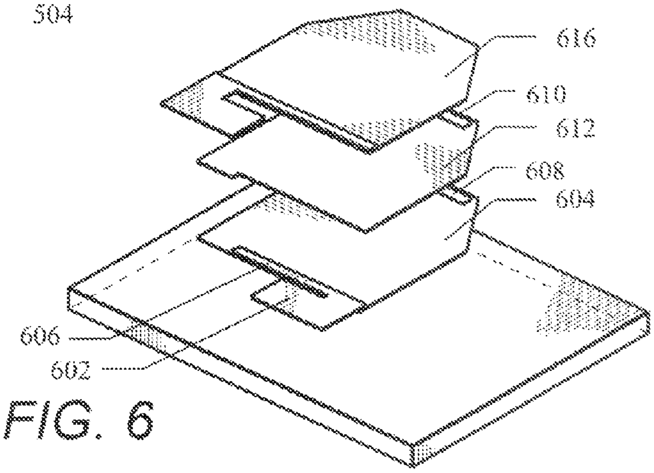
FIG. 6

SYSTEM FOR CHARGING A VAPOR CELL

This invention was made with Government support under Contract No. N66001-02-C-8025 awarded by the U.S. Navy Space and Naval Warfare Systems Center (SPAWAR). The Government has certain rights in this invention.

BACKGROUND OF THE INVENTION

1. Field of the Invention

This invention relates to devices for vapor gas interrogation, and more particularly to chip-scale vapor cells.

2. Description of the Related Art

Advances in microelectromechanical systems (MEMS) have enabled a variety of miniaturized and chip-scale atomic devices used in, for example, gyroscopes, magnetometers and chip-scale atomic clocks. With reduced system dimensions come many advantages, including lower operating power and reduced manufacturing cost for the finished device. Of primary importance in many of these MEMS applications is an atomic vapor cell for use as a frequency-defining element, rather than traditional quartz-crystal resonators, for improved frequency stability.

As is typical for atomic vapor cells during their manufacture, the vapor cell is charged with a sample material that later produces an interrogation gas during heating and subsequent operation. Common sample material examples for atomic vapor cells include rubidium (Rb) and cesium (Cs). The vapor cell is permanently sealed after charging, often using anodic bonding between a silicon substrate containing an interrogation cell enclosing the sample material and a transparent window through which the gas is interrogated after heating. Various techniques have been developed for initially charging the miniaturized vapor cell, such as by transfer of the sample material into the vapor cell using a pin head, heated vapor dispensation or microdroplet dispensing. Of particular concern for any charging method, is the sample material's exposure to oxygen and water vapor. Such exposure produces oxide and hydroxide contaminants which may later result in obscuration of the transparent windows of the vapor cell. Additionally, anodic bonding of the silicon substrate to the glass windows may be frustrated by migration of the sample material itself to the bonding surface prior to or during charging and/or bonding, especially as such bonding surfaces are narrowed in an overall effort to miniaturize the devices.

A need continues to exist for improved vapor charging techniques and apparatuses as such vapor cells are reduced in size.

SUMMARY OF THE INVENTION

A system is disclosed for use in chip-scale vapor cells. Capillary or suction force is used to capture and deposit sample material into the vapor cell for charging and later interrogation. Capillary force results in reduced migration of sample material during manufacture and reduced exposure to atmospheric contaminants.

In one embodiment, a method is described that includes placing an alkali-filled capillary into a reservoir cell formed in a substrate, the reservoir cell in vapor communication with an interrogation cell in the substrate, and bonding a transparent window to the substrate on a common face of the reservoir cell and the interrogation cell to form a compact vapor cell. The capillary action in the capillary delays migration of alkali in the alkali-filled capillary from the reservoir cell into the interrogation cell during the bonding.

In another embodiment, an apparatus is disclosed that has an interrogation cell in a substrate, a reservoir cell in the substrate, the reservoir cell in vapor communication with the interrogation cell through a trench, a first glass window bonded to one side of the substrate and enclosing a first side of the interrogation cell and the reservoir cell, and an alkali-filled capillary disposed in the reservoir cell so that the reservoir cell is charged with an alkali in preparation for subsequent manufacture of a vapor cell.

BRIEF DESCRIPTION OF THE DRAWINGS

The components in the figures are not necessarily to scale, emphasis instead being placed instead upon illustrating the principals of the invention. Like reference numerals designate corresponding parts throughout the different views.

FIG. 1 is a perspective view of a partially-assembled vapor cell having a capillary placed in the reservoir cell for charging the vapor cell with a sample material, in accordance with one embodiment of the invention;

FIGS. 3A through 3C are plan views illustrating multiple embodiments of a vapor cell having a side reservoir cell for receipt of a capillary containing a sample material for vapor cell charging;

FIG. 4 is one embodiment of a vapor cell system having a side reservoir cell for receipt of a capillary containing a sample material for vapor cell charging, and including transparent window heater disposed over an included gas interrogation cell;

FIG. 5 is a perspective view of the transparent window heater first illustrated in FIG. 4;

FIG. 6 is an exploded prospective view of the transparent window heater illustrated in FIG. 5;

DETAILED DESCRIPTION OF THE INVENTION

Figure 2:
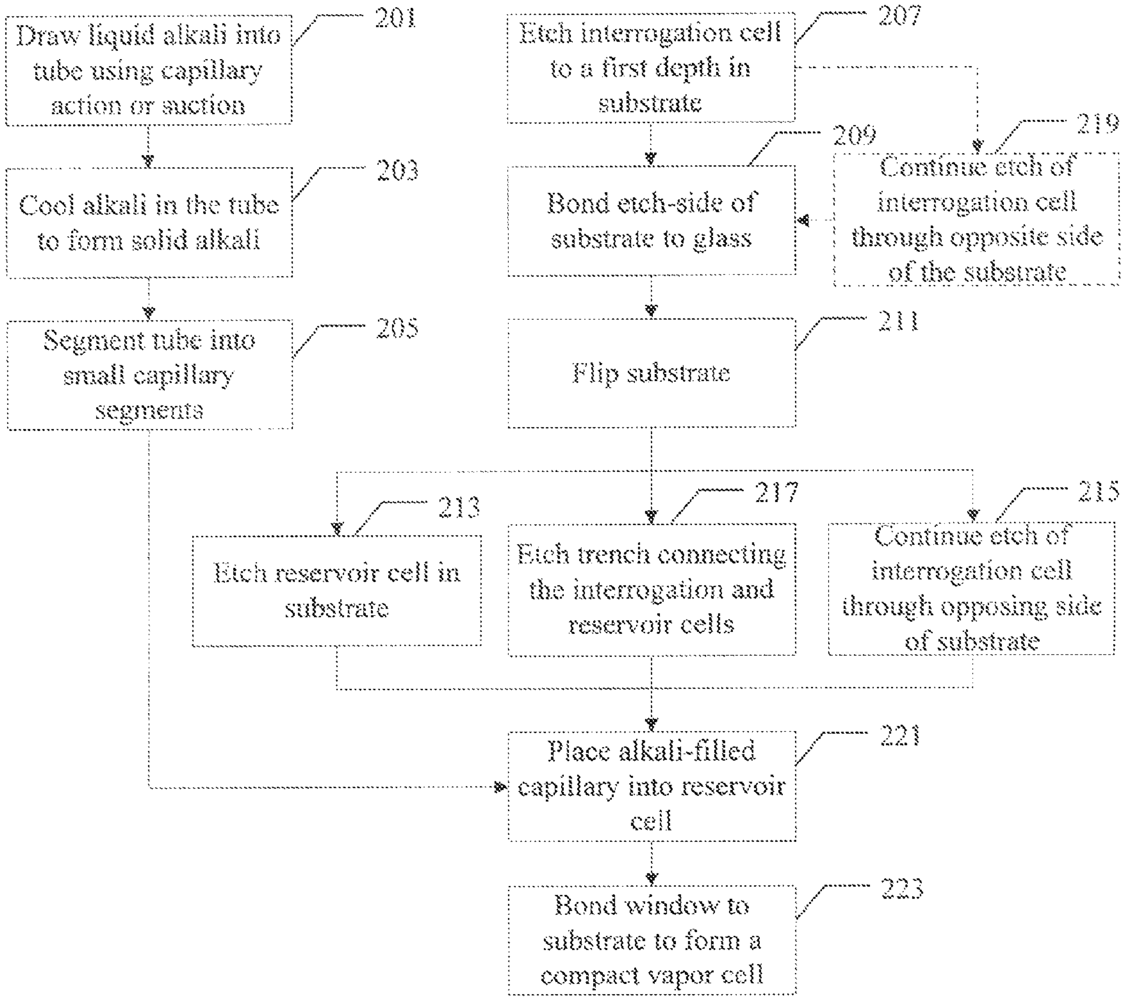
FIG. 2 is a flow diagram illustrating one embodiment of a manufacturing technique for vapor cell assembly and gas charging.

FIG. 1 illustrates one embodiment of a partially-assembled vapor cell 100 that uses as its foundation a substrate 102, preferably silicon crystal. An interrogation cell 104 having a generally cylindrical cross section is formed extending through opposite sides of the substrate 102. The interrogation cell 104 is in vapor communication with a reservoir cell 106, preferably through a trench 108. The reservoir cell 106 is sized to accept a cylindrical capillary 110 which delivers the sample material to the vapor cell for later gas interrogation, in accordance with one embodiment described, below. The reservoir cell 106 also provides a place for sample material, preferably rubidium (Rb) or cesium (Cs), that is not in vapor phase to condense on the coolest part of the vapor cell, outside an optical aperture for the interrogation cell 104, and provides a place outside of the optical aperture for any non-volatile Rb oxides and hydroxides residual from cell filling. The reservoir cell 106 extends partially into the substrate 102 and, although illustrated as having a generally triangular cross section, may be formed into other shapes to better accept the capillary 110. For example, the interrogation cell 104 may be formed into a rectangular or circular cross section in order to facilitate introduction of capillaries of varying size and shape.

The substrate 102 is coupled to an exit window, preferably transparent window 112, on a side opposite from the reservoir cell 106. The transparent window 112 is preferably formed from borosilicate glass, although other materials may be used to both seal the interrogation chamber 104 and provide suitable transparency for electromagnetic (EM) interrogation of the vapor cell 100. If formed of borosilicate glass, such coupling is preferably accomplished by anodic bonding, with the transparent window 112 covering the interrogation chamber 104 on one side of the substrate. Other bonding techniques may be used to bond the window to the substrate 102, however, such as through the use of glass frit, epoxies or other bonding materials. In an alternative embodiment, the reservoir cell 106 extends entirely through the substrate 102 to the exit window 112.

In one vapor cell designed for use in a CSAC device and using a 2 mm silicon wafer thickness having a square configuration, the interrogation cell diameter is preferably 2 mm and the various other elements of the vapor cell have the approximate thicknesses and widths listed in Table 1.

TABLE 1

| | Width (mm) | Thickness (mm) |
|---|---|---|
| Partially-assembled vapor cell (100) | 3-4 | 3.2-4.4 |
| Exit transparent window (112) | 3-4 | 0.2-0.4 |
| Substrate (102) | 3-4 | 2 |
| Entrance transparent window (116) | 3-4 | 0.2-0.4 |
| Trench (108)($t_{chan}$) | 20-100 μm | 50-1000 μm |

FIG. 2 is a flow diagram of one embodiment that illustrates how a vapor cell is assembled and charged with an alkali that is preferably rubidium. Due to the reactivity of alkalis to oxygen and water, its handling is done in a controlled environment, such as a glove box. Alkali in liquid form is drawn into a tube using capillary action or suction (block 201). The alkali is cooled to solid form (block 203) and the tube is then segmented into small capillary segments (block 205) for later insertion into respective reservoir cells. The alkali-filled capillaries are set aside and the vapor cell formed to receive them. For example, an interrogation cell in a silicon substrate is etched to a first depth (block 207) and, preferably, the etched-side of the silicon substrate is bonded to a transparent window such as borosilicate glass using anodic bonding (block 209). The substrate is flipped (block 211) and a reservoir cell is etched into the substrate, as well as a back etch to complete pass-through of the interrogation cell between opposite sides of the substrate. A trench is formed to establish vapor communication between the reservoir and the interrogation cells (blocks 213, 215, 217).

In an alternative embodiment, etch of the interrogation cell continues through one or more etching steps through to the opposite side of the substrate (block 219) prior to bonding the etch-side of the substrate to the transparent window.

With the vapor cell prepared for charging with the alkali-filled capillaries, the capillaries are placed into the reservoir cell (block 221) and a transparent window, preferably borosilicate glass, is bonded to the substrate opposite from the existing exit window using anodic bonding to seal the interrogation and reservoir cells to form a compact vapor cell (block 223). Alkali migration out of the capillary and onto the bonding surfaces is inhibited during the charging and bonding process by capillary action within the capillary, as is unnecessary exposure to oxygen and water vapor.

Although illustrated as generally triangular in FIG. 1, the reservoir cell may be of any suitable shape and formed in vapor communication with the interrogation cell. For example, FIGS. 3A-C illustrate three different implementations of interrogation and reservoir cell pairs etched within a single tailored vapor cell wall, rather than finished in the block-like state illustrated in FIG. 1. In FIG. 3A, the reservoir cell 300 is generally circular and in vapor communication with the interrogation cell 302 through a trench 302. In this implementation, the reservoir cell 300 sits entirely within generally circular inner and outer wall cross sections (306, 308). The capillary 110 is illustrated seated in the reservoir cell 300, indicating the vapor cell has been charged with a delivered sample material.

In an alternative implementation illustrated in FIG. 3B, the reservoir cell 300 is etched to extend into what would otherwise be an interior optical aperture for an associated interrogation cell 310. An interior wall 312 extends into the interrogation cell 310 interior, and may extend axially either the entire axial length of the interrogation cell 310 or as approximately limited by the axial depth of the reservoir cell 110. As in other embodiments, the interrogation cell 310 and reservoir cell 300 are in vapor communication, such as through a trench 314. In a further implementation of a vapor cell, FIG. 3C illustrates an etched reservoir cell 300 that extends an outer wall 316 of the vapor cell 318 beyond what would otherwise be a circular cross section for the outer surface 316 of the vapor cell 318. The capillary 110 is illustrated seated in the interrogation chamber 300 indicating the vapor cell has been charged with a delivered sample material to enable communication of a vapor of the sample material to an interrogation cell 320 through a trench 322 during operation.

FIG. 4 illustrates one embodiment of a fully-assembled vapor cell with a capillary previously placed into the reservoir cell for charging. The substrate 102 having etched interrogation cell 104 and reservoir cell 106 is coupled to transparent entrance window 404, such as by anodic bonding, to vapor seal the reservoir cell 106 from the external environment. An exit window 406 is coupled to an opposite side of the substrate 102, such as by anodic bonding, to complete the vapor seal for the interrogation cell 104. A multi-layer, thin-film heater 408 is in thermal communication with the transparent entrance window 404 at an optical aperture 410 of the interrogation cell 114 through a transparent heater substrate 412. Similarly, a second multi-layer, thin-film heater 414 is in thermal communication with the transparent exit window 406 at an exit optical aperture (not illustrated) of the interrogation cell 114 through a second transparent heater substrate 416. The capillary 110 is disposed in the reservoir cell 106 and so removed from the optical aperture of the interrogation cell 104 to remove any possible obscuration from what would otherwise exist if the capillary 110 was used to introduce the sample material in the interrogation cell 104, itself.

FIGS. 5 and 6 are assembled and exploded perspective views, respectively, of the transparent thin-film heaters used on either side of the vapor cell illustrated in FIG. 4. Preferably, the heater 408 is formed of multiple thin-film zinc-oxide (ZnO) or Indium Tin Oxide (ITO) layers electrically coupled in serial fashion, each layer substantially separated by an insulator, on a transparent heater substrate 412. More particularly, a first pole pad 602 is coupled to a first thin-film layer 604 through a first pole distribution strip 606 at a proximal end 504 of the heater 408. At a distal end 506 of the heater 408, a coupler contact 608 is coupled to the first thin-film layer 604 and extends through a slot 610 in an insulating layer 612 disposed on the first thin-film layer 604. A second layer 614 is formed on the insulating layer 612 and is electrically coupled to the coupler contact 608, with the remainder of second layer 614 insulated from the first thin-film layer 604 by the insulation layer 612 sandwiched between them. A second pole pad 616 is coupled to the second layer 614 through a second pole distribution strip 619. Through the appropriate selection of heater first and second layer (604, 614) thicknesses, widths and lengths, appropriate temperature uniformity an cell heating is provided to the entrance and exit apertures provided in FIG. 4. In one heater designed for operation at 1-10 V. using indium tin oxide (ITO) or zinc oxide (ZnO) and for use with the rubidium-charged vapor cell illustrated in FIG. 4, the heater would have a total resistance of 100-1000 Ohms and resistive heating of 10-100 mW.

Figure 7:
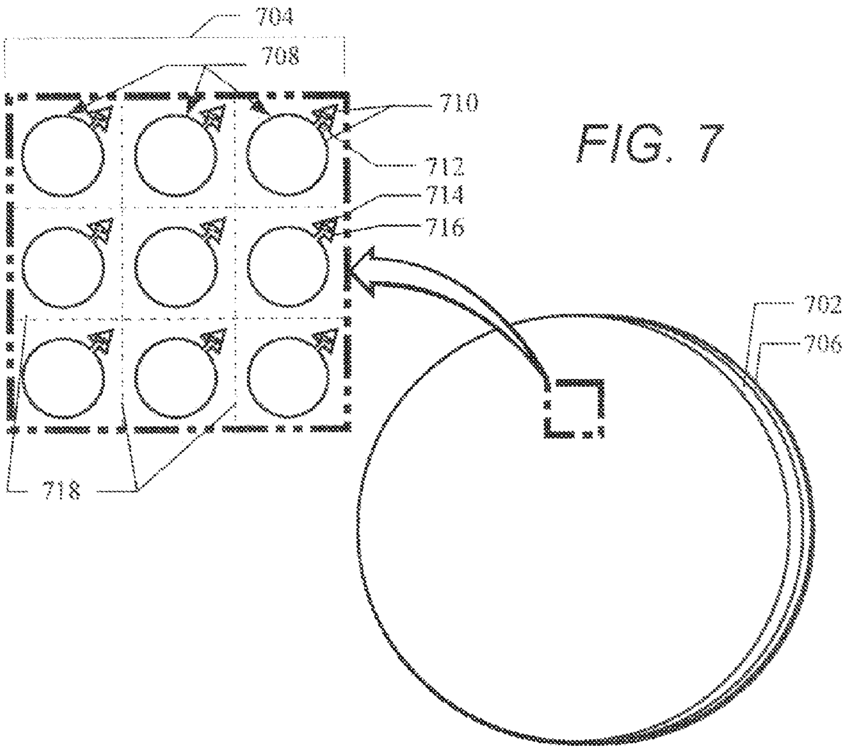
FIG. 7 is a plan view illustrating one embodiment of a plurality of vapor cells formed in a wafer.

The vapor cell illustrated in FIG. 4 may be formed and charged in a variety of different processing steps. FIG. 7. illustrates multiple assembled (but for a transparent entrance window) and charged vapor cells on a single wafer 702. An array 704 of vapor cells are formed in the wafer 702 with a transparent exit window 706 bonded to a backside of the wafer. Each vapor cell 708 in the array of vapor cells 704 has an interrogation cell-reservoir cell pair 710 in vapor communication with each other through a trench 712. Each interrogation-reservoir cell pair 712 is illustrated having a capillary 714 disposed in each respective reservoir cell 716 to charge the interrogation-reservoir cell pair 712 with a sample material for later gas interrogation. The vapor cells 708 may be later diced according to dicing lines 718 after a subsequent processing step bonding a second transparent window to the exposed face of the substrate 702. In an alternative embodiment, a heater and associated heater substrate (each not illustrated) may be bonded to either or both sides of the vapor cell assembly prior to dicing.

Figure 8:
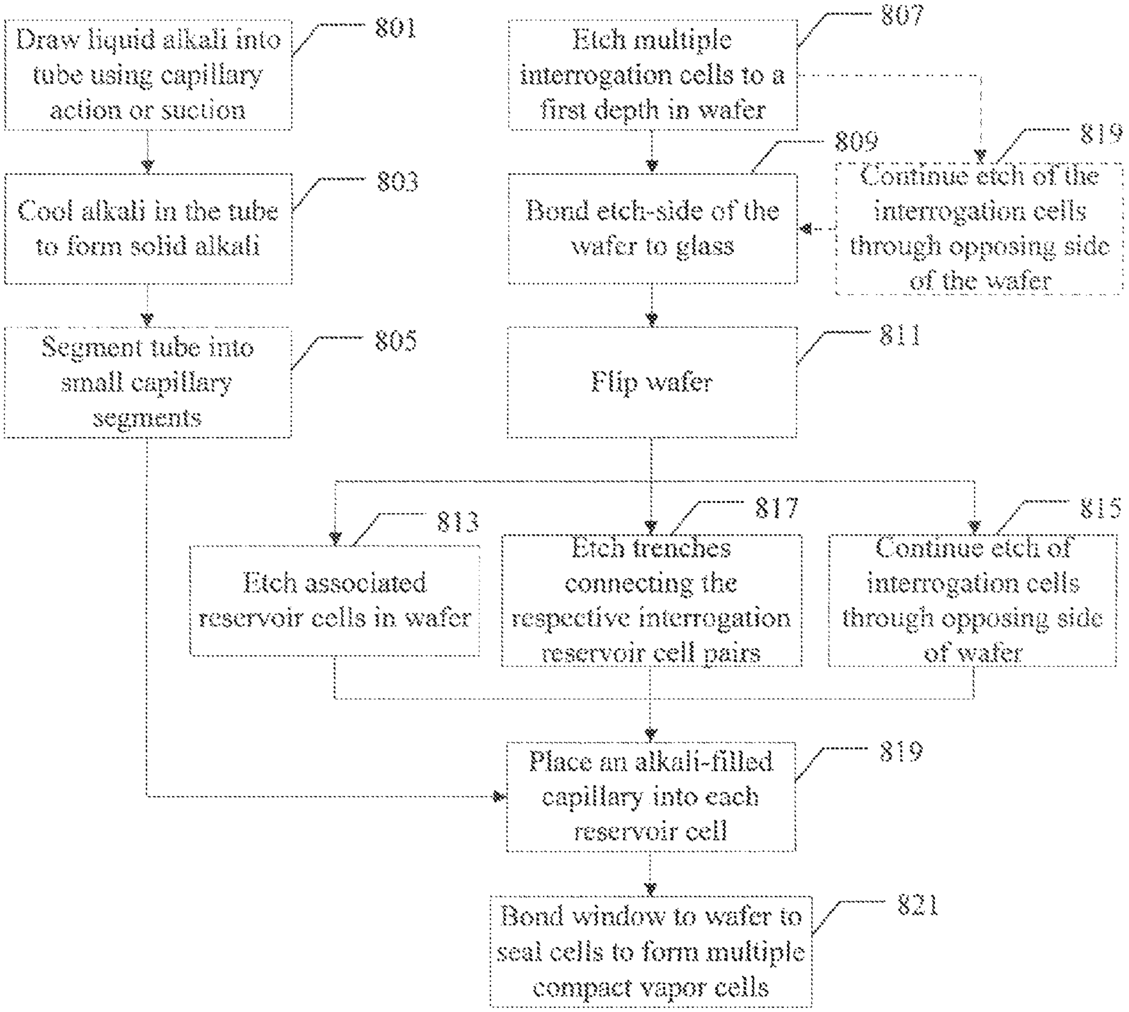
FIG. 8 is a flow diagram illustrating one embodiment of a manufacturing technique for vapor cell assembly and gas charging.

In one embodiment of wafer-level manufacturing of vapor cells, FIG. 8 describes how multiple vapor cell may be assembled and charged with an alkali (and using rubidium as an example) on a wafer. Similar to that described, above, rubidium in liquid form is drawn into a tube using capillary action or suction (block 801). The rubidium is cooled to solid form (block 803) and the tube is segmented into small capillary segments (block 805) for later use. Multiple interrogation cell in a silicon wafer are etched to a first depth (block 807) and, preferably, the etched-side of the silicon wafer is bonded to a transparent window such as borosilicate glass using anodic bonding (block 809). The substrate is flipped (block 811) and reservoir cells associated with respective interrogation cells are etched into the wafer, as well as an etch to complete pass-through of the respective interrogation cells between opposite sides of the wafer. A trench is formed to establish vapor communication between the reservoir and the interrogation cells (blocks 813, 815, 817). In an alternative embodiment, etch of the interrogation cells continues through one or more etching steps to complete the etching down through the wafer to the opposite side of the substrate (block 819) prior to bonding the etch-side of the substrate to the transparent window (block 821).

With the vapor cell prepared for charging with the rubidium-filled capillaries, the capillaries are placed into the reservoir cell (block 821) and a transparent window, preferably borosilicate glass, is bonded to the substrate opposite from the existing exit window using anodic bonding to seal the interrogation and reservoir cells to form a compact vapor cell (block 823). Rubidium migration out of the capillary and onto the bonding surfaces is inhibited during the charging and bonding process by capillary action within the capillary, as is unnecessary exposure to oxygen and water vapor.

Figure 9:
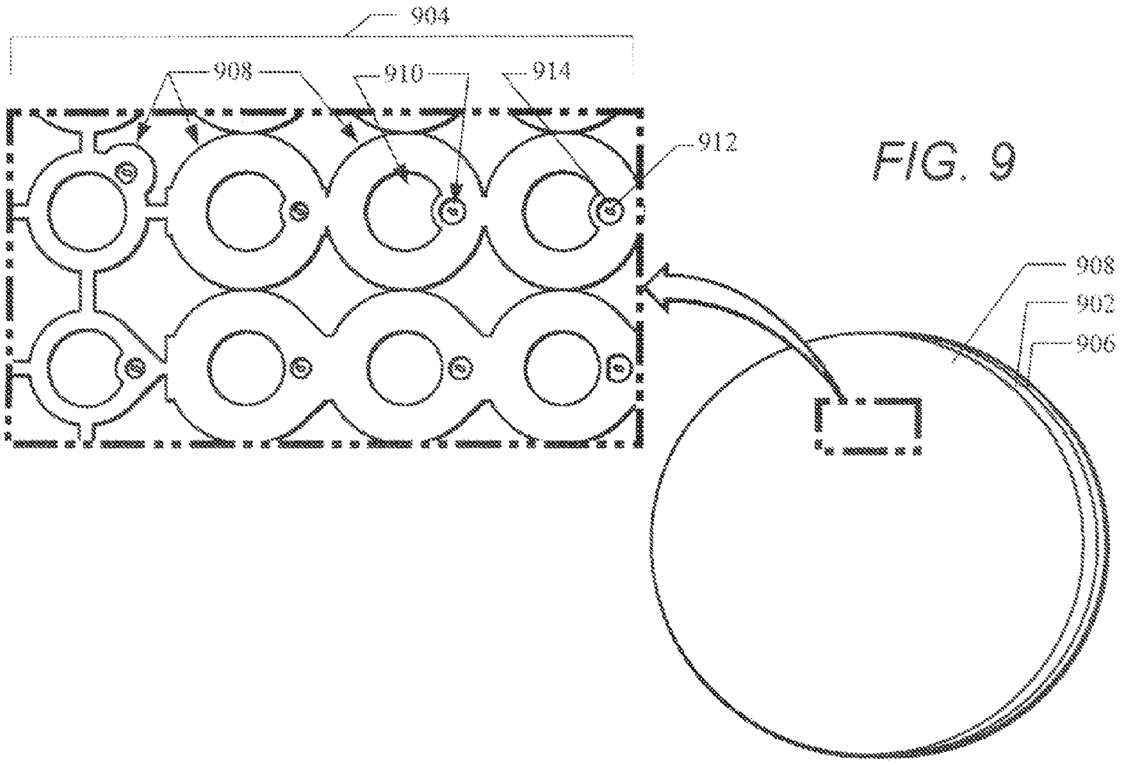
FIG. 9 is a plan view illustrating another embodiment of a plurality of vapor cells formed in a wafer.

FIG. 9 illustrates an alternative embodiment of multiple assembled (but for a transparent entrance window) and charged vapor cells on a single wafer 902. An array of vapor cells 904 are formed in the wafer 902, with a transparent exit window 906 bonded to one side of the wafer such as by anodic bonding. Each vapor cell 908 in the array of vapor cells 704 has an interrogation cell—reservoir cell pair 910 in vapor communication with each other through a trench or other passageway. Each interrogation-reservoir cell pair 910 is illustrated having a capillary 912 disposed in each respective reservoir cell 914 to charge the interrogation-reservoir cell pair 712 with a sample material for later gas interrogation. The vapor cells 908 may be later separated, such as by dicing, after a subsequent processing step bonding a second transparent window to the exposed face of the substrate 918. In an alternative embodiment, a heater and associated heater substrate (each not illustrated) may be bonded to either or both sides of the vapor cell assembly prior to dicing.

While various embodiments of the invention have been described, it will be apparent to those of ordinary skill in the art that many more embodiments and implementations are possible within the scope of this invention.

We claim:

1. A method of charging a compact vapor cell, comprising:
placing an alkali-filled capillary into a reservoir cell formed in a substrate, said reservoir cell in vapor communication with an interrogation cell in said substrate; and
bonding a transparent window to said substrate on a common face of said reservoir cell and said interrogation cell to form a compact vapor cell;
wherein capillary action in said capillary delays migration of alkali in said alkali-filled capillary from said reservoir cell into said interrogation cell during said bonding.

2. The method of claim 1, wherein said alkali-filled capillary comprises a glass tube segment.

3. The method of claim 1, further comprising
drawing a liquid alkali into a tube using a method selected from the group consisting of capillary action and suction;
cooling said liquid alkali to form solid alkali in said tube; and
segmenting said tube having solid alkali to form said alkali-filled capillary.

4. The method of claim 3, wherein said liquid alkali comprises rubidium.

5. The method of claim 3, wherein said liquid alkali comprises cesium.

6. The method of claim 1, wherein said bonding comprises anodic bonding.

7. The method of claim 1, further comprising:
forming said interrogation cell in said substrate;
forming said reservoir cell in said substrate;
forming a trench to form a vapor communication between said interrogation and reservoir working cells.

8. The method of claim 7, wherein said forming said interrogation cell in said substrate comprises:
forming a chamber extending through opposing sides of said substrate.

9. The method of claim 1, wherein said transparent window comprises glass.

10. A method of manufacturing compact vapor cells, comprising:
forming a plurality of interrogation cells in a wafer;
forming a respective plurality of reservoir cells to form interrogation-reservoir cell pairs in vapor communication with each other through a trench;

placing an alkali-filled capillary into each of said plurality of reservoir cells; and bonding a window over each of said interrogation-reservoir cell pairs to establish a plurality of vapor cells on said wafer.

11. The method of claim 10, further comprising:

dicing said wafer to separate each of said interrogation-reservoir cell pairs.

12. The method of 10, further comprising:

drawing a liquid alkali into a tube using capillary action;

cooling said liquid alkali to form solid alkali in said tube; and dicing said tube having solid alkali to form said alkali-filled capillary.

13. An apparatus, comprising:

an interrogation cell in a substrate;

a reservoir cell in said substrate, said reservoir cell in vapor communication with said interrogation cell through a trench;

a first glass window bonded to one side of said substrate and enclosing a first side of said interrogation cell and said reservoir cell; and an alkali-filled capillary disposed in said reservoir cell;

wherein said reservoir cell is charged with an alkali in preparation for subsequent manufacture of a vapor cell.

14. The apparatus of 13, further comprising:

a second glass window bonded to an opposite side of said substrate and enclosing a second side of said interrogation cell to establish a vapor cell.

15. The apparatus of claim 14, wherein said alkali-filled capillary comprises a glass tube having solid-phase alkali.

16. The apparatus of claim 15, wherein said alkali-filled capillary further comprises an alkali selected from the group consisting of rubidium and cesium.

17. The apparatus of claim 13, wherein said interrogation cell has an inner diameter of approximately 2 mm.

* * * * *

UNITED STATES PATENT AND TRADEMARK OFFICE

CERTIFICATE OF CORRECTION

PATENT NO. : 8,258,884 B2
APPLICATION NO. : 12/645207
DATED : September 4, 2012
INVENTOR(S) : Borwick, III et al.

It is certified that error appears in the above-identified patent and that said Letters Patent is hereby corrected as shown below:

On the Title Page, Item (75) Inventor, replace Inventor “Jeffrey F. DaNatale” with “Jeffrey F. DeNatale”

Signed and Sealed this
Sixth Day of August, 2013

Teresa Stanek Rea
*Acting Director of the United States Patent and Trademark Office*